United States Patent
Xu et al.

(10) Patent No.: US 12,163,928 B1
(45) Date of Patent: Dec. 10, 2024

(54) DETECTION DEVICE AND DETECTION METHOD FOR NODE DETECTION

(71) Applicant: Tianjin University, Tianjin (CN)

(72) Inventors: Lianyong Xu, Tianjin (CN); Lei Tian, Tianjin (CN); Lei Zhao, Tianjin (CN); Chao Feng, Tianjin (CN); Molin Su, Tianjin (CN); Yongdian Han, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/809,316

(22) Filed: Aug. 19, 2024

(30) Foreign Application Priority Data

Jul. 24, 2023 (CN) .......................... 202310912113.8

(51) Int. Cl.
*G01N 3/36* (2006.01)

(52) U.S. Cl.
CPC ....... *G01N 3/36* (2013.01); *G01N 2203/0005* (2013.01); *G01N 2203/0016* (2013.01); *G01N 2203/0048* (2013.01); *G01N 2203/0073* (2013.01); *G01N 2203/0256* (2013.01); *G01N 2203/0296* (2013.01)

(58) Field of Classification Search
CPC .... G01N 3/10; G01N 3/36; G01N 2203/0005; G01N 2203/0016; G01N 2203/0256; G01N 2203/0296; G01N 2203/0048; G01N 2203/0073
See application file for complete search history.

(56) References Cited

U.S. PATENT DOCUMENTS 6,619,104 B1 * 9/2003 Yeh .......................... G01N 3/12
73/49.1

FOREIGN PATENT DOCUMENTS

| CN | 104990720 | A | * | 10/2015 |
| CN | 107340177 | | | 11/2017 |
| CN | 108152119 | | | 6/2018 |
| CN | 208335595 | U | * | 1/2019 |
| CN | 112903458 | A | * | 6/2021 |
| CN | 112945728 | | | 6/2021 |
| CN | 112945728 | A | * | 6/2021 |
| CN | 216081413 | | | 3/2022 |
| CN | 216081413 | U | * | 3/2022 |
| CN | 115290315 | A | * | 11/2022 |
| CN | 118090435 | A | * | 5/2024 |

* cited by examiner

*Primary Examiner* — Natalie Huls
(74) *Attorney, Agent, or Firm* — JCIPRNET

(57) ABSTRACT

A detection device includes a frame body and a main pipe positioning assembly, a branch pipe positioning assembly, and a first driving assembly disposed on the frame body. One side of the frame body is provided with an opening. The branch pipe positioning assembly is disposed inside the opening. The first driving assembly adjusts the branch pipe positioning assembly, so that the branch pipe positioning assembly is adapted to positions of the two branch pipes. During detection, the branch pipes are located in the opening, the main pipe positioning assembly connects two ends of the main pipe, and the branch pipe positioning assembly connects the two branch pipes. Two limiting members are slidably disposed on the frame body to open and close the opening, and the limiting members abut against an outer wall of the main pipe, such that the main pipe is located inside or outside the opening.

9 Claims, 3 Drawing Sheets

DETECTION DEVICE AND DETECTION METHOD FOR NODE DETECTION

CROSS-REFERENCE TO RELATED APPLICATION

This application claims the priority benefit of China application serial no. 202310912113.8, filed on Jul. 24, 2023. The entirety of the above-mentioned patent application is hereby incorporated by reference herein and made a part of this specification.

BACKGROUND

Technical Field

The disclosure relates to a detection device, and more specifically to a detection device and a detection method for node detection.

Description of Related Art

With the rapid development of industry, the research on the performance of complex structures has become an important topic, especially in the production of some large parts, the strength of fatigue performance of a welding node has become an increasingly important guarantee for safe production.

In actual production, for a K-type part including a main pipe and two branch pipes, the two branch pipes are both welded to the same position on the main pipe, so that the welding nodes of the main pipe and the branch pipes are at the same position, and the two branch pipes form a certain included angle at the position of the welding node. Due to the large size, complex structure, and multiple loads, there are multiple limitations. In particular, due to factors such as the complex structure and difficulty in clamping of the complex pipe-to-pipe node, it is necessary to develop analysis of the fatigue performance of structural-grade specimens of large and complex welded structures, which fully considers the size effect, and analyzes the fatigue behavior characteristics of the large and complex structures under complex load conditions.

The following issues exist in the conventional related art. The analysis of fatigue performance of structural-grade specimens of K-type parts requires a large test force and has complex specimen preparation, complex load application, and high energy consumption, and connecting parts between the specimens and the test system are prone to breakage, which interferes with the progress of the analysis fatigue of performance and makes it difficult to accurately measure the mechanical properties of nodes under various complex load conditions.

SUMMARY

In order to accurately measure the mechanical properties of a welding node of large parts under various complex load conditions, the disclosure provides a detection device and a detection method for node detection.

The disclosure provides a detection device for node detection adopting the following technical solution.

A detection device for node detection includes a frame body and a main pipe positioning assembly, a branch pipe positioning assembly, and a first driving assembly disposed on the frame body. One side of the frame body is provided with an opening, the branch pipe positioning assembly is disposed inside the opening, and the first driving assembly is used to adjust the branch pipe positioning assembly, so that the branch pipe positioning assembly is adapted to positions of two branch pipes. During detection, the branch pipes are located in the opening, the main pipe positioning assembly is used to connect two ends of a main pipe, and the branch pipe positioning assembly is used to connect the two branch pipes. The main pipe positioning assembly applies a force to the main pipe to detect a welding node of the main pipe, and the branch pipe positioning assembly applies a force to the two branch pipes to detect welding nodes of the branch pipes. Two limiting members are slidably disposed on the frame body, the two limiting members are configured to open and close the opening, and the limiting members abut against an outer wall of the main pipe, such that the main pipe is located inside or outside the opening.

Through adopting the above technical solution, when detecting a part sample, the branch pipes enter the opening on the frame body, the two ends of the main pipe are connected through the main pipe positioning assembly, the branch pipe positioning assembly is connected to the two branch pipes, and the main pipe positioning assembly and the branch pipe positioning assembly may apply the forces to the main pipe and the branch pipes from different angles, so that the mechanical properties of the welding node under various complex load conditions can be accurately measured, and the nodes between the main pipe and the branch pipes are oriented toward the opening to prevent accidents after the branch pipes fall off, and the safety performance during a detecting process is improved. Only the branch pipes are pushed or pulled during detection, and the limiting member limits the position of the main pipe through sliding the limiting member to push or pull the branch pipes, so that the main pipe does not need to be connected to the first oil cylinder to improve the detection efficiency and reduce the labor intensity of the staff.

As further preferred, the main pipe positioning assembly includes two first oil cylinders, and the two first oil cylinders are respectively disposed on two sides of the opening.

Through adopting the above technical solution, an end portion of the main pipe is welded to a piston rod of the first oil cylinder, so that the main pipe and the first oil cylinder are connected as a whole. By applying a pulling force and a pushing force to the main pipe through the first oil cylinder, the mechanical properties at the position of the welding node on the main pipe under different loads can be detected.

As further preferred, the branch pipe positioning assembly includes two second oil cylinders, and the two second oil cylinders are both movably connected to an inside of the opening.

Through adopting the above technical solution, the second oil cylinders are respectively connected to the branch pipes during detection. The second oil cylinders are driven to move through the first driving assembly before connection, so that the second oil cylinders are at a suitable position to better correspond to the positions of the branch pipes, thereby being more stable during connection and having a more accurate detection result.

As further preferred, the first driving assembly includes a bidirectional screw rod, a first driving member, and two installation blocks. The two installation blocks are slidably connected to the frame body along an axial direction parallel to the main pipe, the two second oil cylinders are respectively disposed on the corresponding installation blocks, the bidirectional screw rod is rotatably connected to the frame body, the two installation blocks are respectively threadedly connected and adapted to corresponding end portions of the bidirectional screw rod, and the first driving member is used to drive the bidirectional screw rod to rotate.

Through adopting the above technical solution, when the first driving member drives the bidirectional screw rod to rotate, the two installation blocks may be driven to simultaneously approach or move away from each other, thereby driving the two second oil cylinders to move. Since the part sample to be detected is K-shaped and the two branch pipes are symmetrically disposed, the synchronous movement of the two second oil cylinders can better and faster implement docking at the positions of the corresponding branch pipes to improve the installation efficiency of the part sample.

As further preferred, the first driving assembly further includes two connecting seats. The two connecting seats are respectively rotatably connected to the corresponding installation blocks, and the second oil cylinders are respectively detachably connected to the connecting seats.

Through adopting the above technical solution, the second oil cylinders are respectively installed on the connecting seats, and the connecting seats and the installation blocks are respectively rotatably connected, so that an angle between each of the second oil cylinders and the respective one of the installation blocks may be adjusted, so that the second oil cylinders may be better connected to the branch pipes.

As further preferred, the first oil cylinder is slidably disposed along an opening direction of the opening, and a second driving assembly for driving the first oil cylinder to move is disposed on the frame body.

Through adopting the above technical solution, the second driving assembly drives the first oil cylinder to move, so that the first oil cylinder may be connected to the branch pipes, and each of the second oil cylinders may apply a force to the welding node in a different direction, thereby further improving the load complexity of the part sample and improving the detection accuracy.

As further preferred, the second driving assembly includes a sliding block, a threaded rod, and a second driving member. The sliding block is slidably disposed on the frame body, the first oil cylinder is disposed on the sliding block, the threaded rod is rotatably connected to the frame body and is threadedly connected and adapted to the sliding block, and the second driving member is used to drive the threaded rod to rotate.

Through adopting the above technical solution, the second driving member drives the threaded rod to rotate, so that the sliding block slides on the frame body, and the first oil cylinder is disposed on the sliding block, so that the first oil cylinder may be driven to move to improve the movement stability of the first oil cylinder.

As further preferred, a placement plate and a slide rail are further included. The frame body is slidably disposed on the slide rail, and the placement plate is rotated at an angle after the main pipe and the branch pipes are placed.

Through adopting the above technical solution, when detecting a part, the part is placed on the placement plate, and an angle of the part is adjusted through driving the placement plate to rotate, so that the part is at the optimal detection angle, and after adjusting the part, the frame body moves on the slide rail, so that the branch pipes enter the opening to prevent the situation where the part needs to be adjusted after entering the opening, which is inconvenient to operate.

The disclosure provides a detection method for node detection using the following technical solution.

A detection method for node detection, which is performed by adopting a detection device, includes the following steps.

In step 1, relative positions of the frame body, the main pipe, and the branch pipes are determined, so that the branch pipes are located in the opening.

In step 2, the two ends of the main pipe are connected through the main pipe positioning assembly, and the branch pipe positioning assembly is connected to the two branch pipes.

In step 3, a pulling force is applied to the main pipe by the main pipe positioning assembly, and performance of the welding node on the main pipe is measured.

In step 4, a pulling force or a pushing force is applied to the branch pipes by the branch pipe positioning assembly, and performance of the welding nodes between the branch pipes and the main pipe is measured.

DESCRIPTION OF THE EMBODIMENTS

Figure 1:
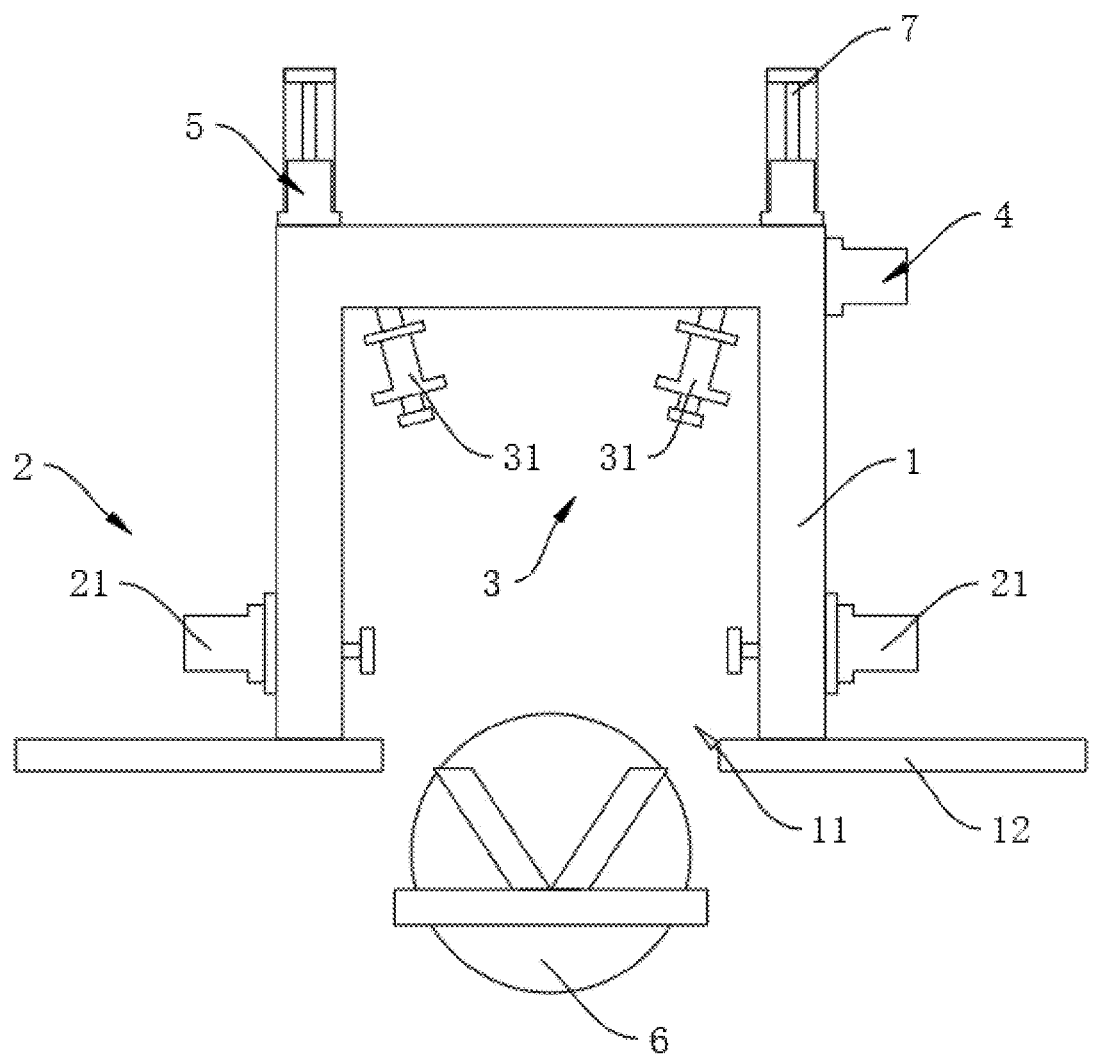
FIG. 1 is a schematic diagram of a top view structure according to an embodiment of the disclosure.
Figure 2:
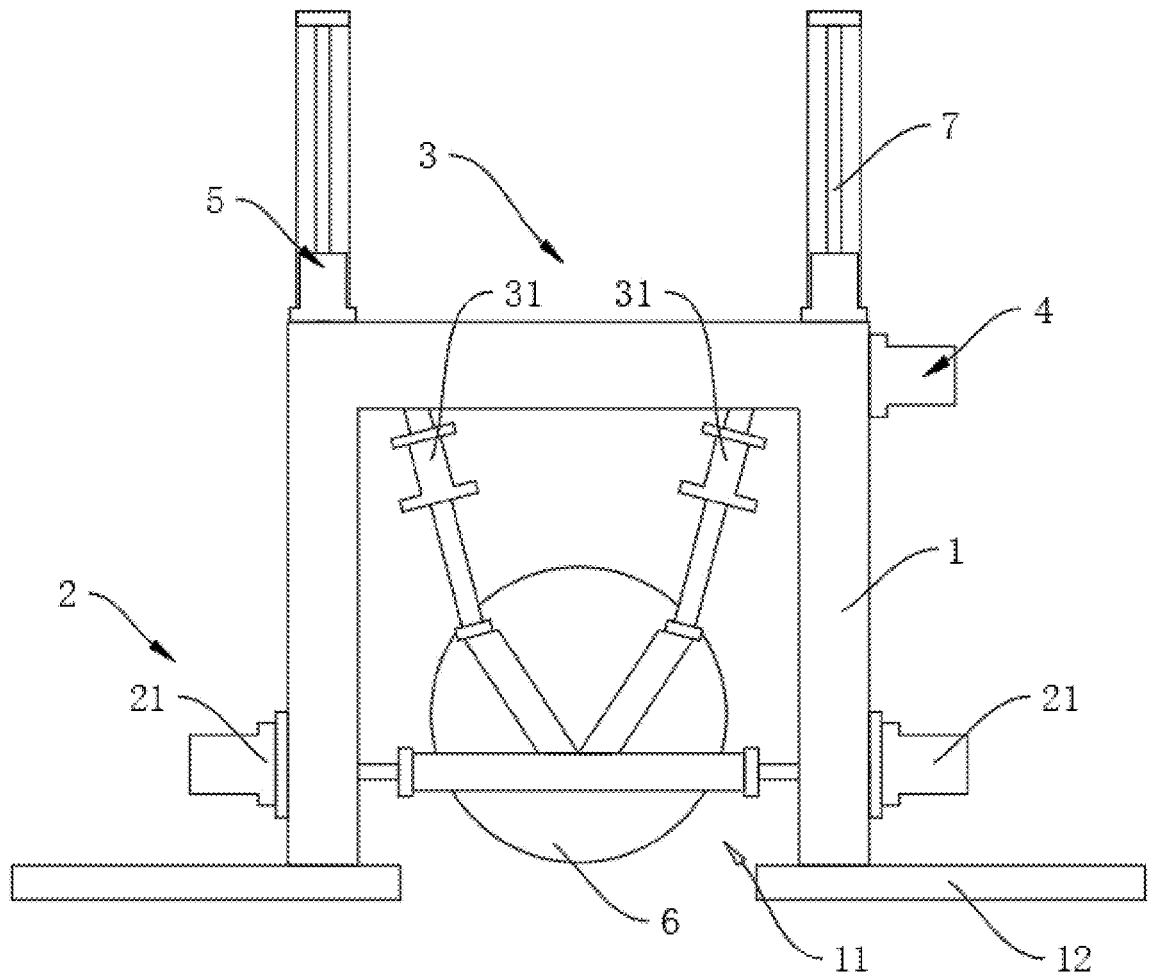
FIG. 2 is a schematic diagram of a top view structure of parts after connection according to an embodiment of the disclosure.
Figure 3:
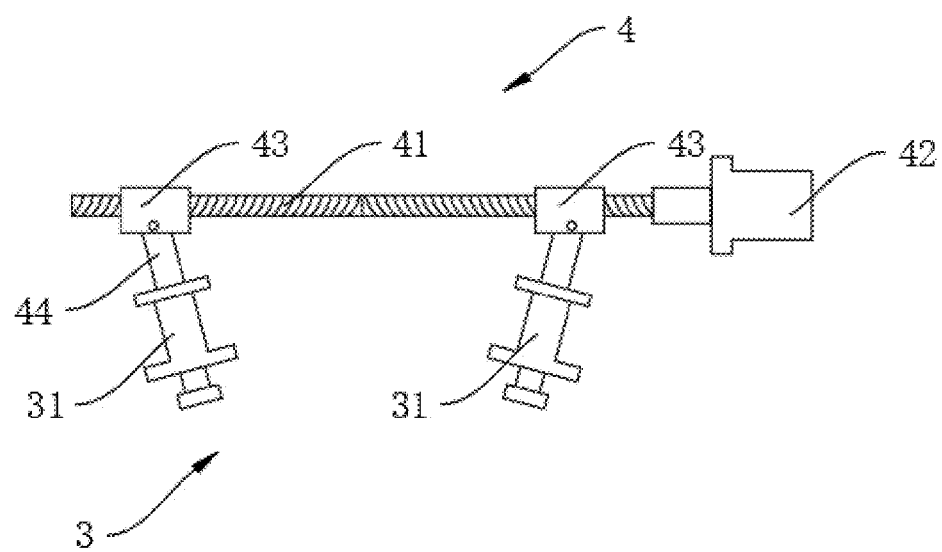
FIG. 3 is a schematic diagram showing an overall structure of a first driving assembly according to an embodiment of the disclosure.
Figure 4:
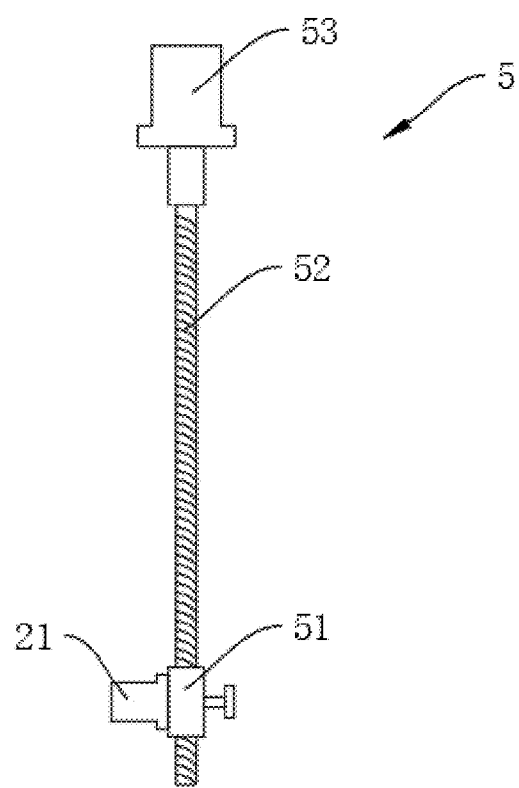
FIG. 4 is a schematic diagram showing an overall structure of a second driving assembly according to an embodiment of the disclosure.

In order for the objectives, technical solutions, and advantages of the disclosure to be more clearly understood, the disclosure is further described in detail below in conjunction with the drawings and the embodiments. It should be understood that the specific embodiments described herein are only used to explain the disclosure and are not used to define the disclosure.

In the description of the disclosure, it is necessary to understand that orientations or positional relationships indicated by terms such as "center", "upper", "lower", "front", "rear", "left", "right", "vertical", "horizontal", "inner", "outer", "clockwise", "counterclockwise", "axial", "radial", and "circumferential" are based on orientations or positional relationships shown in the drawings, are only for the convenience of describing the disclosure and simplifying the description, and do not indicate or imply that the referred device or element must have a specific orientation or be constructed and operated in a specific orientation, and therefore should not be understood as limitation on the disclosure.

In addition, the terms "first" and "second" are used for descriptive purposes only and should not be understood as indicating or implying relative importance or implicitly indicating the quantity of the indicated technical features. Therefore, the features defined as "first" and "second" may explicitly or implicitly include one or more of such features. In the description of the disclosure, "multiple" means two or more than two, unless otherwise clearly and specifically defined.

In the disclosure, unless otherwise expressly specified or defined, terms such as "installed", "connected with", "connected to", and "fixed" should be understood in a broad sense. For example, elements may be fixedly connected, detachably connected, or integrally connected; mechanically connected or electrically connected; directly connected or indirectly connected through an intermediate medium, or the two elements may be internally connected. For persons skilled in the art, the specific meanings of the above terms in the disclosure may be understood according to specific circumstances.

The disclosure is further described in detail below with reference to FIG. 1 to FIG. 4.

An embodiment of the disclosure provides a detection device for node detection.

Referring to FIG. 1, a detection device for node detection is used to detect a K-shaped part sample. The part sample includes a main pipe and two branch pipes connected to the main pipe. Since a welding node of the main pipe and the two branch pipes are located at the same position, it is necessary to apply forces to the welding node at multiple angles for detection to improve the accuracy of detection data.

The detection device includes a frame body 1, a main pipe positioning assembly 2, and a branch pipe positioning assembly 3. The main pipe positioning assembly 2 and the branch pipe positioning assembly 3 are both disposed on the frame body 1. When detecting the part sample, two ends of the main pipe are connected through the main pipe positioning assembly 2, and the branch pipe positioning assembly 3 connects the two branch pipes. One side of the frame body 1 is provided with an opening 11, and the branch pipes enter the opening 11 during detection.

When detecting the part sample, angles of relative positions of the main pipe, the branch pipes, and the frame body 1 are first adjusted. In the embodiment, the detecting device further includes a placement plate 6 and a slide rail 7. The frame body 1 is slidably disposed on the slide rail 7. A bottom portion of the placement plate 6 is provided with a driving motor. The placement plate 6 is rotated at an angle after the main pipe and the branch pipes are placed. After adjusting the part, an axial direction of the main pipe is perpendicular to an opening direction of the opening 11. The frame body 1 moves on the slide rail 7, so that the branch pipes enter the opening 11.

In order to facilitate detection after fixing the sample, the main pipe positioning assembly 2 includes two first oil cylinders 21. The two first oil cylinders 21 are respectively disposed on the frame body 1 at two sides of the opening 11. During detection, an end portion of the main pipe is welded to a piston rod of the first oil cylinder 21, so that the main pipe and the first oil cylinder 21 are connected as a whole. By applying a pulling force and a pushing force to the main pipe through the first oil cylinder 21, the mechanical properties at the position of the welding node under different loads are detected. In the embodiment, a connecting block is fixedly connected to the piston rod of the first oil cylinder 21, which is welded to the main pipe through the connecting block.

The branch pipe positioning assembly 3 includes two second oil cylinders 31, and the two second oil cylinders 31 are both movably connected to the inside of the opening 11. The branch pipes are respectively welded to piston rods of the second oil cylinders 31 during detection, so that the branch pipes and the second oil cylinders 31 are connected as a whole. By applying a pulling force and a pushing force to the branch pipes through the second oil cylinders 31, the mechanical properties at the position of the welding nodes under different loads are detected. Similarly, a connecting block is also fixedly connected to the piston rod of each second oil cylinder 31, which is welded to the branch pipe through the connecting block.

The frame body 1 is provided with a first driving assembly 4 for driving the second oil cylinders 31 to move, so that the two second oil cylinders 31 are at suitable positions, so that angles formed by the two second oil cylinders 31 and the two branch pipes are adapted, and through changing the positions of the second oil cylinders 31, the branch pipes are subjected to forces in different directions. In the embodiment, the first driving assembly 4 includes a bidirectional screw rod 41, a first driving member 42, two installation blocks 43, and two connecting seats 44. The two installation blocks 43 are slidably connected to the frame body 1 along an axial direction parallel to the main pipe. The frame body 1 is provided with a strip groove slidably adapted to the installation blocks 43. The two connecting seats 44 are respectively rotatably connected to the corresponding installation blocks 43. The second oil cylinders 31 are respectively detachably connected to the connecting seats 44 through bolts, so that the position and the angle of the second oil cylinders 31 may be adjusted.

The bidirectional screw rod 41 is rotatably connected to the frame body 1, the two installation blocks 43 are respectively threadedly connected and adapted to corresponding end portions of the bidirectional screw rod 41, and the first driving member 42 is used to drive the bidirectional screw rod 41 to rotate. In the embodiment, the first driving member 42 is a first motor. The first motor is fixedly installed on the frame body 1, and the bidirectional screw rod 41 is coaxially fixedly connected to an output shaft of the first motor. When the first motor drives the bidirectional screw rod 41 to rotate, the two installation blocks 43 may be driven to simultaneously approach or move away from each other, thereby driving the two second oil cylinders 31 to move. Since the part sample to be detected is K-shaped and the two branch pipes are symmetrically disposed, the synchronous movement of the two second oil cylinders 31 can better and faster implement docking at the positions of the corresponding branch pipes, and the directions of the forces applied to the two branch pipes are also the same.

Two limiting members 12 are slidably disposed on the frame body 1. Specifically, the limiting members 12 are limiting plates, and the limiting plates are used to open and close the opening 11. The limiting members 12 abut against an outer wall of the main pipe, so that the main pipe is located inside or outside the opening 11. When the main pipe enters the opening 11, the two limiting plates close the opening 11. When each second oil cylinder 31 applies a pushing force to the branch pipes, the main pipe does not need to be connected to the first oil cylinder 21, and the position of the main pipe may be fixed through the limiting plates. Similarly, when the second oil cylinders 31 apply pulling forces to the branch pipes, the main pipe is located outside the opening 11, and the two limiting plates approach each other to limit the main pipe, so that the welding nodes of the branch pipes may be detected.

In order to further improve the accuracy of detection of the welding nodes of the branch pipes, the first oil cylinder 21 may apply a load to the branch pipes from the side. The first oil cylinder 21 is slidably disposed along the opening direction of the opening 11. The frame body 1 is provided with a second driving assembly 5 for driving the first oil cylinder 21 to move. The second driving assembly 5 includes a sliding block 51, a threaded rod 52, and a second driving member 53. The sliding block 51 is slidably connected to the frame body 1. The frame body 1 is provided with a slide groove slidably adapted to the sliding block 51. The first oil cylinder 21 is fixedly installed on the sliding block 51 through a bolt. The threaded rod 52 is rotatably connected to the frame body 1 and is threadedly connected and adapted to the sliding block 51. The second driving member 53 is used to drive the threaded rod 52 to rotate. In the embodiment, the second driving member 53 is a second motor. The second motor is fixedly installed on the frame body 1, and the threaded rod 52 is coaxially fixedly connected to an output shaft of the second motor. After the first oil cylinder 21 moves, force application to the welding nodes of the branch pipes in a direction different from the second oil cylinder 31 is implemented, thereby further improving the load complexity of the part sample and improving the detection accuracy.

The first oil cylinder 21 and the second oil cylinder 31 are both connected to a data acquisition module, so that detected data can be better recorded.

The disclosure also provides a detection method for node detection.

A detection method for node detection includes the following steps.

In step 1, relative positions of the frame body 1, the main pipe, and the branch pipes are determined, the part sample is placed on the placement plate 6 and the placement plate 6 is then rotated to adjust the position of the part sample, and the frame body 1 moves on the slide rail 7, so that the branch pipes are located in the opening 11.

In step 2, the two ends of the main pipe are connected through the main pipe positioning assembly 2, the main pipe is welded to the connecting block at an end portion of the first oil cylinder 21, the branch pipe positioning assembly 3 is connected to the two branch pipes, and after the first driving assembly 4 adjusts the positions of the second oil cylinders 31, the branch pipes are respectively welded to the connecting blocks at end portions of the second oil cylinders 31.

In step 3, the first oil cylinder 21 is activated to apply a pulling force to the main pipe, and the performance of the welding node on the main pipe is measured.

In step 4, each of the second oil cylinders 31 is activated to apply a pulling force or a pushing force to the respective one of the branch pipes, the performance of the welding nodes between the branch pipes and the main pipe is measured, and different data according to different positions of the second oil cylinders 31 and different directions of the applied force is recorded.

In step 2, when each of the second oil cylinders 31 applies a pulling force or a pushing force to the respective one of the branch pipes, the main pipe may be limited through sliding the limiting member 12, and the main pipe does not need to be connected to the first oil cylinder 21, which can improve the detection efficiency.

In summary, the disclosure at least includes the following beneficial technical effects.

1. When detecting the part sample, the branch pipe enters the opening on the frame body, the two ends of the main pipe are connected through the main pipe positioning assembly, the branch pipe positioning assembly is connected to the two branch pipes, and the main pipe positioning assembly and the branch pipe positioning assembly may apply the forces to the main pipe and the branch pipes from different angles, so that the mechanical properties of the welding node under various complex load conditions can be accurately measured.

2. The second oil cylinders are respectively connected to the branch pipes during detection. Each of the second oil cylinders is driven to move through the first driving assembly before connection, so that each second oil cylinder is at a suitable position to better correspond to the position of the corresponding branch pipe, thereby being more stable during connection and having a more accurate detection result.

3. When detecting the part, the part is placed on the placement plate, and the angle of the part is adjusted through driving the placement plate to rotate, so that the part is at the optimal detection angle, and after adjusting the part, the frame body moves on the slide rail, so that the branch pipes enter the opening to prevent the situation where the part needs to be adjusted after entering the opening, which is inconvenient to operate.

The above are all preferred embodiments of the disclosure and are not intended to limit the protection scope of the disclosure. Therefore, any equivalent change made according to the structure, shape, and principle of the disclosure should be included in the protection scope of the disclosure.

What is claimed is:

1. A detection device for node detection, comprising a frame body and a main pipe positioning assembly, a branch pipe positioning assembly, and a first driving assembly disposed on the frame body, wherein one side of the frame body is provided with an opening, the branch pipe positioning assembly is disposed inside the opening, and the first driving assembly is configured to adjust the branch pipe positioning assembly, so that the branch pipe positioning assembly is adapted to positions of two branch pipes; during detection, the branch pipes are located in the opening, the main pipe positioning assembly is configured to connect two ends of a main pipe, and the branch pipe positioning assembly is configured to connect the two branch pipes; the main pipe positioning assembly applies a force to the main pipe to detect a welding node of the main pipe, and the branch pipe positioning assembly applies a force to the two branch pipes to detect welding nodes of the branch pipes, two limiting members are slidably disposed on the frame body, the two limiting members are configured to open and close the opening, and the limiting members abut against an outer wall of the main pipe, such that the main pipe is located inside or outside the opening.

2. The detection device for node detection according to claim 1, wherein the main pipe positioning assembly comprises two first oil cylinders, and the two first oil cylinders are respectively disposed on two sides of the opening.

3. The detection device for node detection according to claim 2, wherein the first oil cylinders are slidably disposed along an opening direction of the opening, and a second driving assembly for driving movement of the first oil cylinders is disposed on the frame body.

4. The detection device for node detection according to claim 3, wherein the second driving assembly comprises a sliding block, a threaded rod, and a second driving member, the sliding block is slidably disposed on the frame body, the first oil cylinder is disposed on the sliding block, the threaded rod is rotatably connected to the frame body and is threadedly connected and adapted to the sliding block, and the second driving member is configured to drive the threaded rod to rotate.

5. The detection device for node detection according to claim 1, wherein the branch pipe positioning assembly comprises two second oil cylinders, and the two second oil cylinders are both movably connected to an inside of the opening.

6. The detection device for node detection according to claim 5, wherein the first driving assembly comprises a bidirectional screw rod, a first driving member and two installation blocks, the two installation blocks are slidably connected to the frame body along an axial direction parallel to the main pipe, the two second oil cylinders are respectively disposed on the corresponding installation blocks, the bidirectional screw rod is rotatably connected to the frame body, the two installation blocks are respectively threadedly connected and adapted to corresponding end portions of the bidirectional screw rod, and the first driving member is configured to drive the bidirectional screw rod to rotate.

7. The detection device for node detection according to claim 6, wherein the first driving assembly further comprises two connecting seats, the two connecting seats are respectively rotatably connected to the corresponding installation blocks, and the second oil cylinders are respectively detachably connected to the connecting seats.

8. The detection device for node detection according to claim 1, further comprising a placement plate and a slide rail, wherein the frame body is slidably disposed on the slide rail, and the placement plate is rotated at an angle after placing the main pipe and the branch pipes.

9. A detection method for node detection, performed by adopting the detection device according to claim 1, the detection method comprising:
    step 1: determining relative positions of the frame body, the main pipe, and the branch pipes, such that the branch pipes are located in the opening;
    step 2: connecting the two ends of the main pipe through the main pipe positioning assembly, and connecting the branch pipe positioning assembly to the two branch pipes;
    step 3: applying a pulling force to the main pipe by the main pipe positioning assembly, and measuring performance of the welding node on the main pipe; and
    step 4: applying a pulling force or a pushing force to the branch pipes by the branch pipe positioning assembly, and measuring performance of the welding nodes between the branch pipes and the main pipe.

\* \* \* \* \*